US011328367B2

(12) United States Patent
Sandridge et al.

(10) Patent No.: US 11,328,367 B2
(45) Date of Patent: May 10, 2022

(54) METHOD, APPARATUS, AND COMPUTER READABLE MEDIUM FOR TRANSFERRING OF PROMOTIONS

(71) Applicant: Groupon, Inc., Chicago, IL (US)

(72) Inventors: Jonathan Gray Sandridge, Palo Alto, CA (US); Curtis Lee, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 13/786,828

(22) Filed: Mar. 6, 2013

(65) Prior Publication Data

US 2014/0257945 A1   Sep. 11, 2014

(51) Int. Cl.
*G06Q 50/00* (2012.01)
*G06Q 30/02* (2012.01)

(52) U.S. Cl.
CPC ......... *G06Q 50/01* (2013.01); *G06Q 30/0207* (2013.01)

(58) Field of Classification Search
CPC .... G06Q 20/10; G06Q 20/202; G06Q 20/401; G06Q 30/02; G06Q 30/0241; G06Q 30/0244; G06Q 30/0255; G06Q 50/01; G06Q 20/209; G06Q 20/223; G06Q 20/3278; G06Q 20/40; G06Q 20/405; G06Q 30/0224; G06Q 30/0234; G06Q 30/0246; G06Q 30/0261; G06Q 30/0268; G06Q 30/0269; G06Q 30/0275; G06Q 30/08; G06Q 40/00; G06Q 40/025; G06Q 40/04; G06Q 40/08; G06Q 10/0631; G06Q 10/087; G06Q 10/1053; G06Q 10/1057; G06Q 10/109; G06Q 10/1093; G06Q 10/1097; G06Q 20/02; G06Q 20/023; G06Q 20/027; G06Q 20/065; G06Q 20/0655; G06Q 20/102; G06Q 20/1085; G06Q 20/123; G06Q 20/20; G06Q 20/204; G06Q 20/227; G06Q 20/327; G06Q 20/363; G06Q 20/38; G06Q 20/381; G06Q 20/383; G06Q 20/403; G06Q 20/407; G06Q 30/018;
(Continued)

(56) References Cited

U.S. PATENT DOCUMENTS

2005/0010673 A1 * 1/2005 Satuloori ................ H04L 29/06 709/231
2009/0259535 A1 * 10/2009 Chow ................ G06Q 30/0239 705/14.39
(Continued)

*Primary Examiner* — Chinyere Mpamugo
(74) *Attorney, Agent, or Firm* — Alston & Bird LLP

(57) ABSTRACT

Provided herein are systems, methods and computer readable media for facilitating transfer of promotions. A promotion and marketing service may allow for assignment of one or more promotions to a first provider or consumer. A method for transferring promotions may include assigning a promotion to a first user account. The promotion may be redeemable by a first user account to obtain a good, service, or experience. The method may also include receiving a request to transfer the promotion to at least one second user account, receiving a promotion reassignment trigger, and in response to receiving the promotion reassignment trigger, assigning the promotion to the second user account using a processor, wherein assignment of the promotion to the second user account enables the second user account to redeem the promotion to obtain the good, service, or experience.

12 Claims, 8 Drawing Sheets

(58) Field of Classification Search
CPC ........... G06Q 30/0201; G06Q 30/0202; G06Q 30/0204; G06Q 30/0205; G06Q 30/0222; G06Q 30/0235; G06Q 30/0236; G06Q 30/0237; G06Q 30/0238; G06Q 30/0239; G06Q 30/0242; G06Q 30/0245; G06Q 30/0247; G06Q 30/0249; G06Q 30/0254; G06Q 30/0264; G06Q 30/0265; G06Q 30/0266; G06Q 30/0267; G06Q 30/0273; G06Q 30/0277; G06Q 30/06; G06Q 30/0635; G06Q 30/0641; G06Q 40/02; G06Q 40/06; G06Q 40/123; G06Q 40/125; G06Q 50/06; G06Q 50/188; G06Q 50/26; G06Q 30/00; G06Q 30/0251; G06Q 30/0256; G06Q 50/22; G06Q 50/24; G06Q 30/0207–0277; H04W 4/21; H04W 4/021; H04W 4/00; G06F 16/951; G06F 16/9537; G06F 16/434; G06F 16/438; G06F 16/958; G06F 17/227; G06F 17/24; G06F 3/04842; G06F 17/212; G06F 17/248; G06F 2203/04804; G06F 3/0481; G06F 3/14; G06F 9/442; G06F 9/44505; G06F 16/00; G06F 16/2343; G06F 17/217; G06F 17/30861; G06F 19/3418; G06F 19/3456; G06F 21/44; G06F 3/048; G06F 3/0482; G06F 3/04847; G06F 21/6218; G06F 9/50; H04L 67/02; H04L 67/10; H04L 51/32; H04L 67/18; H04L 67/2833; H04L 67/327; H04L 63/102; H04L 63/10; H04L 63/105; H04L 47/70; H04L 12/08; H04L 4/80; H04L 4/021

See application file for complete search history.

(56) References Cited

U.S. PATENT DOCUMENTS

| | | | |
|---|---|---|---|
| 2011/0029363 A1* | 2/2011 | Gillenson et al. | 705/14.15 |
| 2011/0047013 A1* | 2/2011 | McKenzie, III | G06Q 10/10 705/14.4 |
| 2011/0313840 A1* | 12/2011 | Mason | G06Q 30/02 705/14.35 |
| 2012/0323664 A1* | 12/2012 | Klems | 705/14.26 |
| 2013/0085838 A1* | 4/2013 | Tennenholtz | G06Q 10/04 705/14.41 |
| 2013/0246138 A1* | 9/2013 | Johnson | G06Q 30/02 705/14.16 |

\* cited by examiner

METHOD, APPARATUS, AND COMPUTER READABLE MEDIUM FOR TRANSFERRING OF PROMOTIONS

FIELD

Embodiments of the invention relate, generally, to providing promotions and, more particularly, to transferring promotions.

BACKGROUND

Providers sell goods and services (collectively referred to herein as "products") to consumers. The providers can often control the form of their product offers, the timing of their product offers, and the price at which the products will be offered. The merchant may sell products at a brick-and-mortar sales location, a virtual online site, or both. Merchants have developed various forms of discounts, promotions, and other methods to provide additional value to consumers in an effort to entice consumers to purchase their wares. As technology has advanced, so to have these marketing and promotional techniques, and with new methods of providing value to consumers, so too have new challenges and problems been identified.

Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include systems, methods and computer readable media for facilitating transfer of purchased promotions between consumers and providers. For example, provided here is a method for transferring purchased promotions from a first consumer to a second consumer. The method may include issuing a promotion to a first consumer account. The promotion may be assigned to the first consumer, such that the first consumer may redeem the promotion to obtain a good, service, or experience associated with the promotion. The method may further include receiving a promotion reassignment trigger. In response to receiving the promotion reassignment trigger, the method may transfer the promotion to a second consumer, such that the second consumer may redeem the promotion to obtain the good, service, or experience.

Embodiments may include a method for transferring promotions. The method may include assigning a promotion to a first user account. The promotion may be redeemable by the first user account to obtain a good, service, or experience. The method may further include receiving a request to transfer the promotion to at least one second user account, receiving a promotion reassignment trigger, and, in response to receiving the promotion reassignment trigger, assigning the promotion to the second user account using a processor. Assignment of the promotion to the second user account may enable the second user account to redeem the promotion to obtain the good, service, or experience. The method may include sending a notification to the at least one second user account to notify the at least one second user account of the promotion. The notification may be at least one of an e-mail, a text message, or a social network message. The notification may include a link that, upon selection of the link, causes the promotion reassignment trigger to be sent. The notification may be a post to a social network. The method may further include verifying an identity of the second user account prior to assigning the promotion to the second user account.

Embodiments may also include additional embodiments of a method for transferring promotions. Some of these embodiments may include generating a notification using a processor. The notification may be associated with a one or more promotions. The notification may also include an interface control that, when selected, initiates a transfer of at least one of the promotions to a user account associated with selection of the interface control. The method may include providing the notification to a plurality of user accounts, receiving at least one promotion reassignment trigger in response to a selection of the interface control, and, in response to receiving the promotion reassignment trigger, causing the transfer of the at least one of the promotions to the user account associated with selection of the interface control. The method may also include causing a transfer of each of the one or more promotions in response to receiving a plurality of promotion reassignment triggers from the plurality of user accounts. The method may include verifying that each user account does not receive more than one of the one or more promotions. In some embodiments, the method may include verifying that at least one untransferred promotion remains prior to causing the transfer. The notification may be at least one of an e-mail, a social network post, or a text message. The notification may be a social network post and the method further comprises verifying the identity of the user account that selected the notification using the social network to which the notification was provided. The identity of the user account may be linked to an account with a promotion and marketing service, and the transfer of the at least one of the promotions may be caused by the promotion and marketing service. The plurality of user accounts may be associated with social networking contacts of a user generating the notification.

Embodiments may also include a computer program product. The computer program product may include at least one computer-readable storage medium having computer-readable program code portions stored therein. The computer-readable program code portions may include an executable portion configured to assign a promotion to a first user account. The promotion may be redeemable by the first user account to obtain a good, service, or experience. The code portions may also include an executable portion configured to receive a request to transfer the promotion to at least one second user account, an executable portion configured to receive a promotion reassignment trigger, and an executable portion configured to, in response to receiving the promotion reassignment trigger, assign the promotion to the second user account, enabling the second user account to redeem the promotion to obtain the good, service, or experience.

Embodiments may include another computer program product comprising at least one computer-readable storage medium having computer-readable program code portions stored therein. The computer-readable program code portions may include an executable portion configured to generate a notification. The notification may be associated with one or more promotions and include an interface control that, when selected, initiates a transfer of at least one of the promotions to a user account associated with selection of the interface control. The computer-readable program code portions may also include an executable portion configured to provide the notification to a plurality of user accounts, an executable portion configured to receive at least one promotion reassignment trigger in response to a selection of the interface control, and an executable portion configured to, in response to receiving the promotion reassignment trigger, cause the transfer of the at least one of the promotions to the user account associated with selection of the interface control. The computer program product may include an executable portion configured to cause a transfer of each of the one or more promotions in response to receiving a plurality of promotion reassignment triggers from the plurality of user accounts. In some embodiments, the computer program product includes an executable portion configured to verify that each user account does not receive more than one of the one or more promotions. The computer program product may also include an executable portion configured to verify that at least one untransferred promotion remains prior to causing the transfer. The notification may be at least one of an e-mail, a social network post, or a text message. In some embodiments, the notification may be a social network post and the computer program product may include an executable portion configured to verify the identity of the user account that selected the notification using the social network to which the notification was provided.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
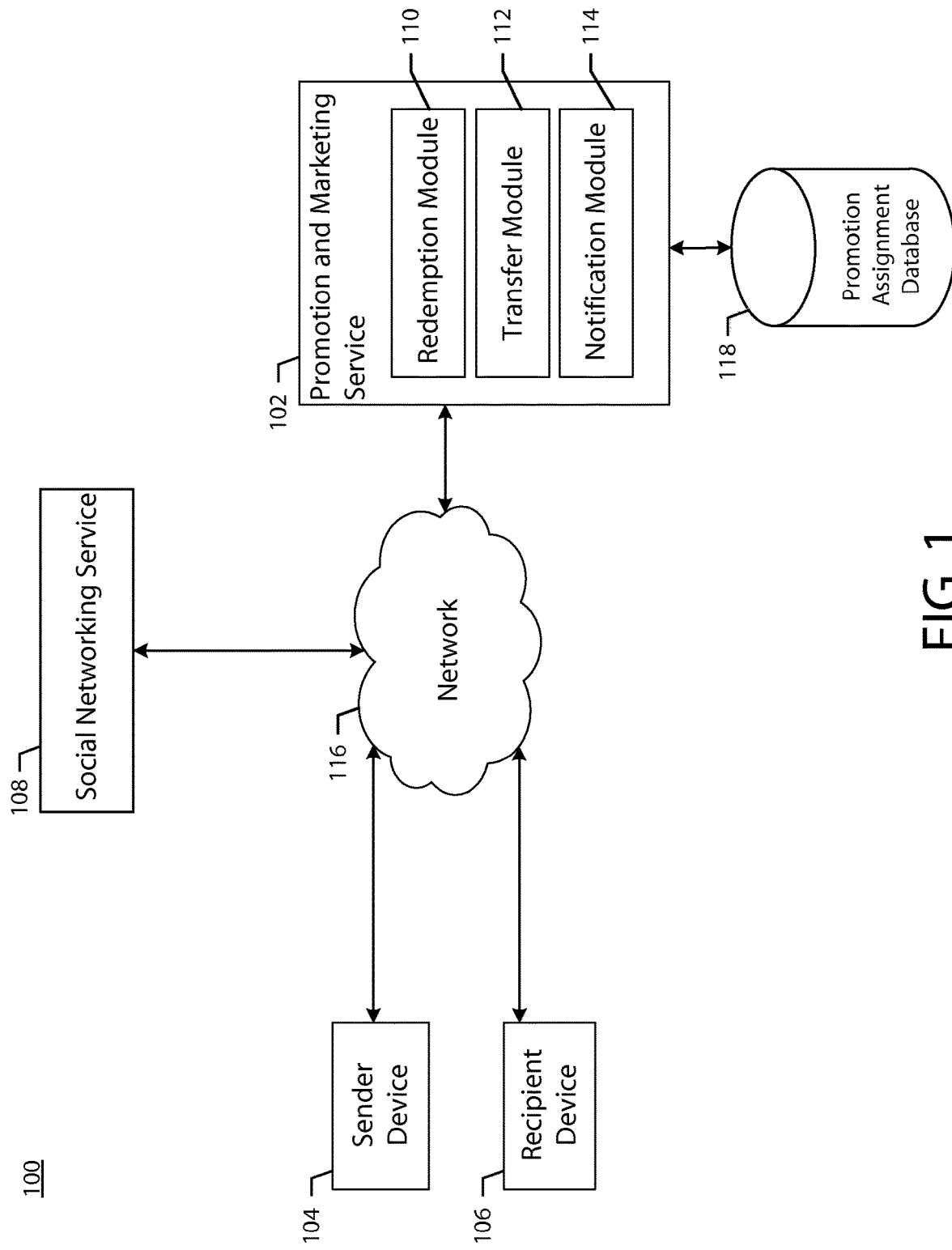
FIG. 1 depicts an example of a system in accordance with some embodiments discussed herein.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions and Overview

Discounts and promotions have been used as part of some retail strategies. In this regard, a promotion and marketing service may assist providers by facilitating the distribution of promotions to consumers. The promotion and marketing service may ensure that promotions are provided in an organized and efficient manner in order to maximize the return on investment and marketing utility received by the provider from the promotions. However, circumstances may exist where consumers obtain promotions (e.g., by purchasing instruments that may be redeemed to obtain a discount or other benefit of the promotion), but do not take advantage of the promotion. These promotions may be assigned to the particular consumer, where they remain, unused. Unused promotions are inconvenient for providers, in that they may represent liabilities to the provider that must be accounted for until redemption. Furthermore, unused promotions fail to serve the marketing interest of the provider, as one of the benefits of issuing promotions is to entice customers to try the products offered by the provider. From the consumer perspective, unused promotions typically represent a financial loss to the consumer, as many promotions may require a payment to access. In this regard, a number of deficiencies and problems associated with the systems used to, among other things, provide discounts to consumers have been identified.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may be offered by merchants in an exchange with a consumer. For example, a merchant may offer access to a promotion to a consumer in exchange for a sum of dollars. Promotions may also be created and purchased by the merchant themselves. For example, a merchant may request a set of promotions from a promotion and marketing service, and the promotion and marketing service may provide the merchant with the ability to offer said set of promotions to consumers in exchange for a nominal fee. Promotions are typically described as being associated with a particular merchant or consumer account, whereby the associated merchant or consumer has "ownership" of the promotion in that they may redeem the promotion for a product, good, service, or the like. Redemption may occur by using an instrument associated with the promotion, as described below.

An example promotion, using a running apparel company as an example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

The term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. A consumer or merchant that is associated with a particular promotion may generate an instrument to use the promotion. For example, a consumer may print an instrument comprised of a barcode on a sheet of paper, such that a merchant may scan the barcode with a barcode scanner to redeem the promotion. As another example, a consumer may associate the promotion with their particular mobile device, such that the mobile device transmits a code via near-field communication to a near-field communication receiver, and the transmitted code acts as the instrument. Upon use of the instrument, the promotion may be marked by the promotion and marketing system as redeemed, such that a particular promotion may not be redeemed more than once (unless, for example, the consumer purchases a quantity of more than one of the promotion). In some embodiments, instruments may be associated with particular consumers in addition to particular promotions, and transfer of the promotion to another consumer as described herein may cause a revocation of any instruments associated with the first consumer. In some examples, the instrument may take the form of tender that has a given value that is exchangeable for goods, services and/or experiences and/or a reduction in a purchase price of a particular good, service or experience.

In some examples, the instrument may have multiple values, such as accepted value, a promotional value and/or a residual value. For example, using the aforementioned running company as the example provider, an electronic indication in a mobile application may show $50 of value to spend at the running company, and access to the promotion may be provided in exchange for $25. In some examples, the accepted value of the instrument (e.g., $25) may be defined by the value exchanged for the instrument, and the promotional value (e.g., $50) may be defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

Example embodiments of promotion transfer operations are provided herein. Although some example embodiments relate to the transfer of promotions from a first consumer to a second consumer, and some example embodiments relate to transfer of promotions from providers to consumers, it should be readily appreciated that the various examples relating to transfer between consumers and transfer from a provider to a consumer are equally applicable. As such, it should be understood that such examples are equally applicable whether the sender or recipient is a provider or a consumer.

Example Network Architecture

FIG. 1 depicts a system 100 that includes an example of a network architecture for a system in accordance with some embodiments discussed herein. The system 100 may include one or more devices and sub-systems that are configured to implement some embodiments as discussed herein. For example, the system 100 may include a promotion and marketing service 102. The promotion and marketing service 102 may communicate with a sender device 104, a recipient device 106, and a social networking service 108. The promotion and marketing service 102 may store information on promotion assignments within a promotion assignment database 118. The promotion and marketing service 102 may provide for the transfer of promotions from a first consumer to a second consumer in accordance with embodiments of the invention.

The sender device 104 and the recipient device 106 may be computing devices, such as desktop computers, laptop computers, personal digital assistants, smartphones, cellular phones, netbook computers, or any other device operable to place product orders or receive digital notifications. In the present context, the sender device 104 and the receiver device 106 are generally described as being associated with two separate consumers (e.g., a first consumer with the sender device and a second consumer with the recipient device). However, embodiments of the invention may be equally applicable to scenarios where the first consumer and the second consumer utilize the same device. As such, the examples herein should not be understood to be limited to embodiments which require two separate devices.

The promotion and marketing service 102 may function as a host or server computer to provide for accepting, generating, transferring, and otherwise accessing promotions and associated instruments. In some embodiments, the promotion and marketing service 102 may be configured to receive requests for and to provide promotions via a web interface. The promotion and marketing service 102 may comprise a redemption module 110, a transfer module 112, and a notification module 114. Each of the modules 110, 112, 114 may be implemented as hardware, software, or a combination of the two as described below with respect to FIG. 2.

The redemption module 110 may provide the capability of redeeming an instrument in order to take advantage of a promotion. For example, the redemption module 110 may be operable to verify the validity of an instrument, and to notify a point-of-sale system of the successful redemption so that the consumer redeeming the instrument is provided with the benefit associated with the promotion. In some embodiments, the redemption module 110 may receive an identity of a particular consumer, and verify that the consumer is associated with the redeemed instrument and/or promotion by accessing the promotion assignment database 118. Additionally or alternatively, the redemption module 110 may provide the capability to redeem a promotion without using an instrument; for example, the redemption module 110 may provide an interface that interfaces with a provider system to notify the provider of the promotion for which the consumer is eligible, and to facilitate redemption of the promotion directly without the need for an instrument. In some embodiments, the redemption module 110 may also provide an interface for a consumer to purchase access to the promotion, and to associate the purchased promotion with the purchasing consumer in the promotion assignment database 118.

The transfer module 112 may provide the ability to transfer a promotion associated with a first consumer to a second consumer. For example, a first consumer may purchase access to a promotion, but change their mind about using the promotion. The transfer module 112 may provide the capability for the first consumer to reassign the promotion to a second consumer such that the second consumer may take advantage of the promotion. The transfer module 112 may further provide for confirmation of the transfer of the promotion. For example, the second consumer may be provided with an interface to accept the transfer of the promotion, and the promotion may not be transferred to the second consumer until the second consumer accepts the promotion from the first consumer. In this manner, the reassignment may not occur until the transfer module 112 detects a promotion reassignment trigger. The promotion reassignment trigger may be understood to include a particular criterion or set of criteria that must be met prior to causing the transfer of the promotion from the first consumer to the second consumer. Example promotion reassignment triggers may include the second consumer indicating that they wish to accept the promotion via an interface control presented in a web interface by the promotion and marketing service, or selection of a link in an e-mail or other message, such as generated by the notification module 114. The term "interface control" should be understood to refer to any element of a user interface that may be selected. For example, the interface control may include buttons, text (e.g., hyperlinks), menus, scroll bars or any other component of an application interface that is selectable by a cursor movement, gesture, keystroke, mouse click or any other method of interacting with a computer. Additionally or alternatively, the promotion reassignment trigger may include selection of an interface control provided by a social networking service, such as the social networking service 108. A promotion reassignment trigger provided in this manner may further include verification of the second consumer's identity via the social networking service 108, such as by a unified login operation that verifies the second consumer's credentials with the social networking service 108. For example, the first consumer may designate that the promotion should be transferred to a particular second consumer by providing the transfer module 112 with a social networking account for the second consumer (e.g., a Facebook® or Twitter® account). The transfer module 112 may verify with the particular social network that a consumer seeking to accept the transfer is, in fact, associated with the designated social networking account by using an identity authentication mechanism provided by that social networking account.

In some embodiments, the transfer module 112 may further provide for determining that the second consumer is a valid recipient of the promotion offer by ensuring that the second consumer can comply with any redemption terms associated with the promotion. For example, if the promotion is for a bottle of wine, the transfer module 112 may verify that the second consumer is at least 21 years of age prior to assigning the promotion to the second consumer. The transfer module 112 may also determine whether the second consumer is associated with a valid user account, a valid e-mail address, a valid social network account, a valid payment account (e.g., a savings account, a credit card, PayPal®) or the like, prior to transferring the promotion.

The transfer module 112 may facilitate transfer of the promotion from the first consumer to the second consumer by reassigning the promotion from the first consumer to the second consumer within the promotion assignment database. For example, the promotion assignment database 118 may include references for each promotion offered by the promotion and marketing system 102, and to which consumers those promotions are associated. As one specific example, the promotion may be transferred between the consumers by modifying the consumer to which the particular promotion is associated.

In some embodiments, the transfer module 112 may further track the status of a promotion transfer operation. For example, once the first consumer initiates transfer of the promotion, the promotion may be marked as "in transfer" and the promotion may be locked from redemption until the transfer has completed (e.g., until the second consumer has been verified as being eligible for the promotion and the second consumer has accepted the transfer). In some embodiments, the first consumer may abort the transfer prior to acceptance of the transfer by the second consumer.

The notification module 114 may notify consumers of the status of their transfer operations. This status notification may include generating an e-mail, text message, social network message, a message via the promotion and marketing system, or any other method of informing consumers of the status of a promotion transfer operation. For example, a second user may be notified of an incoming promotion transfer via an e-mail generated by the notification module 114, and the e-mail may include a hyperlink to accept the transfer to reassign the promotion to the second consumer's account. In some embodiments, the notification module 114 may determine that the second consumer does not have an active account with the promotion and marketing system 102, and the notification may also provide the user with a link to register with the promotion and marketing system 102.

The notification module 114 may be further configured to interface with one or more social networking services 108. For example, the notification module 114 may be configured to "post" or "tweet" a notification of the deal transfer to one or more social networking accounts designated by the first consumer. The notification module 114 may act in conjunction with the transfer module 112 to designate consumers to receive the promotion. For example, the notification module 114 may send a notification to a particular consumer's social network account with a link that is only valid for the particular consumer. In such circumstances, an identity authentication mechanism provided by the social networking service 108 may be used to confirm the identity of the recipient. Alternatively or additionally, the notification module 114 may send a notification to a plurality of users. For example, the first consumer may create a post in a public or group location (e.g., the user's "Wall"), including a link to obtain the promotion. As such, the first user to select the link from the user's public or group location would receive the reassigned deal offer. The notification module 114 and/or transfer module 112 may provide the ability to configure such notifications to identify if the promotion should be sent to a single consumer, a group of consumers, or as a public redemption. As another example, the notification module 114 may generate a post containing a link to the promotion. Content associated with the link may provide additional content about the promotion, such as the value of the promotion, and terms and conditions associated with the promotion, or any other information about the promotion as displayed in content separate from the original post. In response to selection of the link, the selecting consumer may be presented with an interface that allows the selecting consumer to view the additional content and to initiate a transfer of the promotion to the selecting consumer. The selecting consumer may elect to initiate the transfer, or the consumer may decide the promotion is not of their interest and they may instead leave the content without accepting the transfer or otherwise decline the transfer. The additional content may only be viewable until the promotion is accepted by a user. For example, the link may direct a second consumer to a "promotion already claimed" page in the event a first consumer has already accepted a transfer of the promotion.

In some embodiments, the notification module 114 may also function to notify users of expiring promotions. For example, a promotion purchased by a user or otherwise associated with a user account may only be valid for a particular time period (e.g., 1 month, 3 months, 6 months, 4 weeks, or the like). As the expiration date of the promotion approaches, the notification module 114 may send a message to the user account associated with the promotion, reminding the user that the promotion is due to expire. In some embodiments, this message may include a link or other interface control to enable the user to transfer the promotion to another user. For example, the message may include a statement to the effect of, "This promotion is expiring soon, would you like to give it to another user as a gift?"

Additionally or alternatively, the redemption module 110, the transfer module 112, and/or the notification module 114 may be used by providers for similar reassignment operations as those described above with respect to reassignment from a first consumer to a second consumer. For example, a provider may purchase several promotions and provide notifications on a personal web page, via one or more e-mails, or via a provider social network page, and provide links to reassign the purchased promotions to consumers.

The promotion and marketing service 102, the sender device 104, the recipient device 106, and the social network service 108 may communicate with one another via a network 116. The network 116 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 116 may include a cellular telephone, an 802.11, 802.16, 802.20, and/or WiMax network. Further, the network 116 may include a public network, such as the Internet, a private network, such as an intranet, or combinations thereof, and may utilize a variety of networking protocols now available or later developed including, but not limited to TCP/IP based networking protocols.

Example System Architecture

Figure 2:
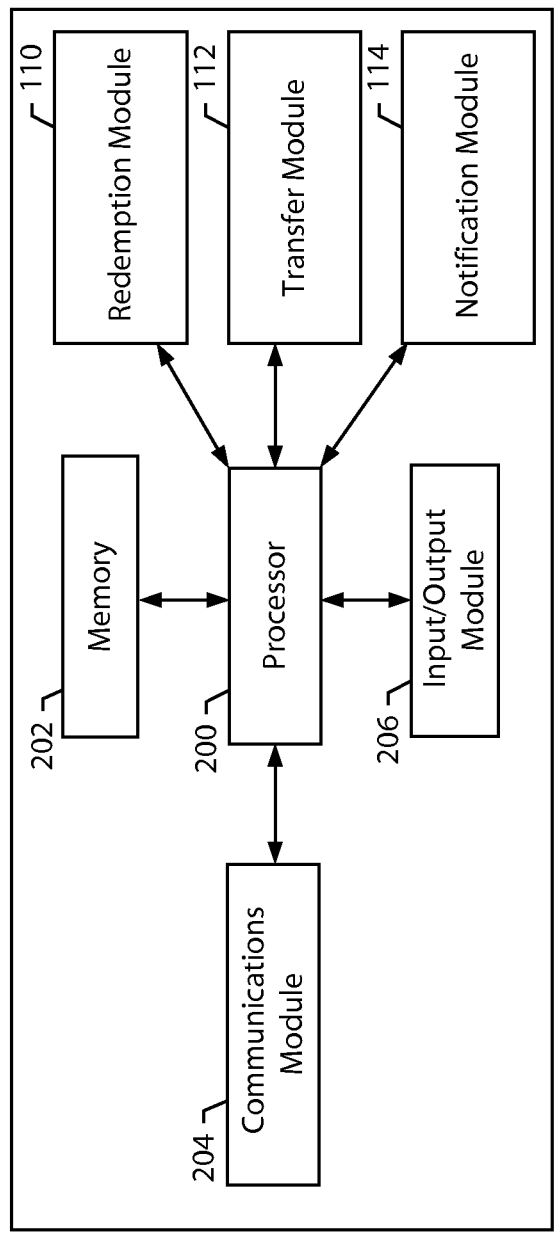
FIG. 2 depicts a schematic block diagram of an example of circuitry that can be included in a computing device, such as an order fulfillment system, in accordance with some embodiments discussed herein.

FIG. 2 shows a block diagram of example circuitry that may be included in the promotion and marketing service 102, which may be configured to perform the analysis, management and/or other functionality discussed in connection with the promotion and marketing service 102 described with respect to FIG. 1. As illustrated in FIG. 2 and in accordance with some example embodiments, the promotion and marketing service 102 may include various means, such as a processor 200, a memory 202, a communications module 204, an input/output module 206, a redemption module 110, a transfer module 112, and a notification module 114.

The processor 200 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 200 comprises a plurality of processors. The plurality of processors may be embodied on a single computing device or may be distributed across a plurality of computing devices collectively configured to function as circuitry. The plurality of processors may be in operative communication with one another and may be collectively configured to perform one or more functionalities of the order fulfillment system 102 as described herein. In an example embodiment, the processor 200 is configured to execute instructions stored in the memory 202 or otherwise accessible to the processor 200. These instructions, when executed by the processor 200, may cause the order fulfillment system 102 to perform one or more of the functionalities as described herein.

Whether configured by hardware, firmware/software methods, or by a combination thereof, the processor 200 may comprise an entity capable of performing operations according to embodiments of the present invention while configured accordingly. Thus, for example, when the processor 200 is embodied as an ASIC, FPGA or the like, the processor 200 may comprise specifically configured hardware for conducting one or more operations described herein. Alternatively, as another example, when the processor 200 is embodied as an executor of instructions, such as may be stored in the memory 202, the instructions may specifically configure the processor 200 to perform one or more algorithms and operations described herein, such as those described with respect to FIGS. 3-8.

The memory 202 may comprise, for example, volatile memory, non-volatile memory, or some combination thereof. Although illustrated in FIG. 2 as a single memory, the memory 202 may comprise a plurality of memory components. The plurality of memory components may be embodied on a single computing device or distributed across a plurality of computing devices. In various embodiments, the memory 202 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 202 may be configured to store information, data (including deal parameter data and/or analytics data), applications, instructions, or the like for enabling the promotion and marketing service 102 to carry out various functions in accordance with example embodiments of the present invention. For example, in at least some embodiments, the memory 202 is configured to buffer input data for processing by the processor 200. Additionally or alternatively, in at least some embodiments, the memory 202 is configured to store program instructions for execution by the processor 200. The memory 202 may store information in the form of static and/or dynamic information. This stored information may be stored and/or used by the order fulfillment system 102 during the course of performing its functionalities.

The communications module 204 may be embodied as any device or means embodied in circuitry, hardware, a computer program product comprising computer readable program instructions stored on a computer readable medium (e.g., the memory 202) and executed by a processing device (e.g., the processor 200), or a combination thereof that is configured to receive and/or transmit data from/to another device, such as, for example, the sender device 104, the recipient device 106, the social network service 108, and/or the like. In some embodiments, the communications module 204 (like other components discussed herein) can be at least partially embodied as or otherwise controlled by the processor 200. In this regard, the communications module 204 may be in communication with the processor 200, such as via a bus. The communications module 204 may include, for example, an antenna, a transmitter, a receiver, a transceiver, network interface card and/or supporting hardware and/or firmware/software for enabling communications with another computing device. The communications module 204 may be configured to receive and/or transmit any data that may be stored by the memory 202 using any protocol that may be used for communications between computing devices. The communications module 204 may additionally or alternatively be in communication with the memory 202, the input/output module 206 and/or any other component of the order fulfillment system 102, such as via a bus.

The input/output module 206 may be in communication with the processor 200 to receive an indication of a user input and/or to provide an audible, visual, mechanical, or other output to a user (e.g., a promotional system administrator and/or cloud computer programmer). As such, the input/output module 206 may include support, for example, for a keyboard, a mouse, a joystick, a display, a touch screen display, a microphone, a speaker, a RFID reader, barcode reader, biometric scanner, and/or other input/output mechanisms. In embodiments wherein the promotion and marketing service 102 is embodied as a server, aspects of the input/output module 206 may be reduced as compared to embodiments where the promotion and marketing service 102 is implemented as an end-user machine (e.g., consumer device and/or merchant device) or other type of device designed for complex user interactions. In some embodiments (like other components discussed herein), the input/output module 206 may even be eliminated from the promotion and marketing service 102. The input/output module 206 may be in communication with the memory 202, the communications module 204, and/or any other component(s), such as via a bus. Although more than one input/output module and/or other component can be included in the promotion and marketing service 102, only one is shown in FIG. 2 to avoid overcomplicating the drawing (like the other components discussed herein).

The redemption module 110, the transfer module 112, and the notification module 114 may also be included and configured to transfer promotions as described above with respect to FIG. 1. In some embodiments, some or all of the functionality of providing digital notification to recipients of physical products may be performed by processor 200. In this regard, the example processes and algorithms discussed herein can be performed by at least one processor 200. For example, non-transitory computer readable media can be configured to store firmware, one or more application programs, and/or other software, which include instructions and other computer-readable program code portions that can be executed to control each processor (e.g., the processor 200) of the components of the promotion and marketing service 102 to implement various operations, including the examples shown above. As such, a series of computer-readable program code portions are embodied in one or more computer program products and can be used, with a computing device, server, and/or other programmable apparatus, to produce machine-implemented processes.

Example Interfaces

Figure 3:
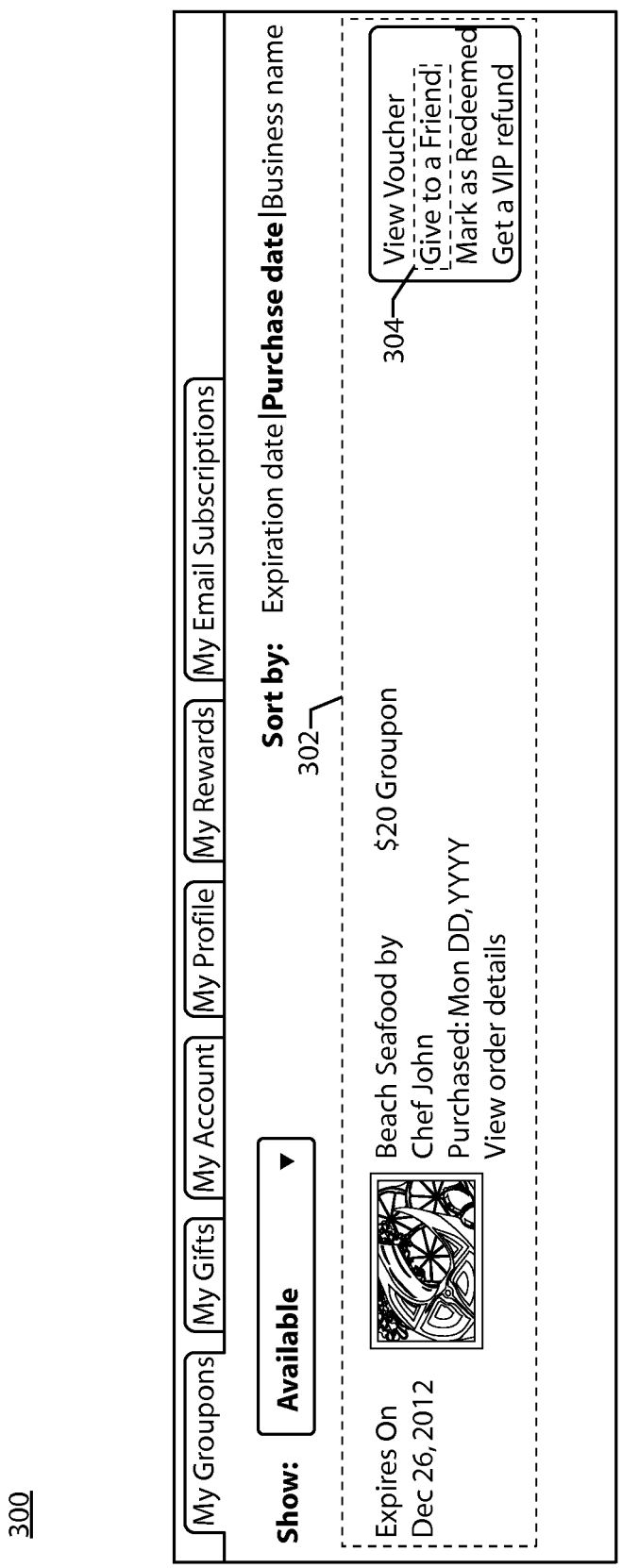
FIG. 3 depicts a screen capture of an interface for reassigning a promotion in accordance with some embodiments discussed herein.

FIG. 3 depicts a screen capture of an interface 300 for reassigning a promotion in accordance with some embodiments discussed herein. The interface 300 depicts a display for reassigning a promotion within an example of a promotion and marketing service. The interface 300 includes a display of one or more promotions, such as the promotion 302. The promotion 302 may include various information and details about the particular promotion, such as the name of the provider, the value of the promotion, an image associated with the promotion, or the like. The promotion 302 may be further associated with a menu that includes an interface control 304 to initiate a transfer of the promotion to another consumer. For example, upon selection of the interface control 304, the consumer may be presented with an interface that allows for selection of a recipient consumer, such as by allowing the first consumer to input an e-mail address or other identifier for the second user. In some embodiments, selection of the interface control 304 may provide the first consumer with an interface to select from the first consumer's contacts (e.g., from an e-mail address book), the first consumer's social networking "friends" (e.g., Facebook® friends or Twitter® followers), or the like. The first consumer may also be presented with an interface to draft a message to notify the recipient of the promotion transfer.

Figure 4:
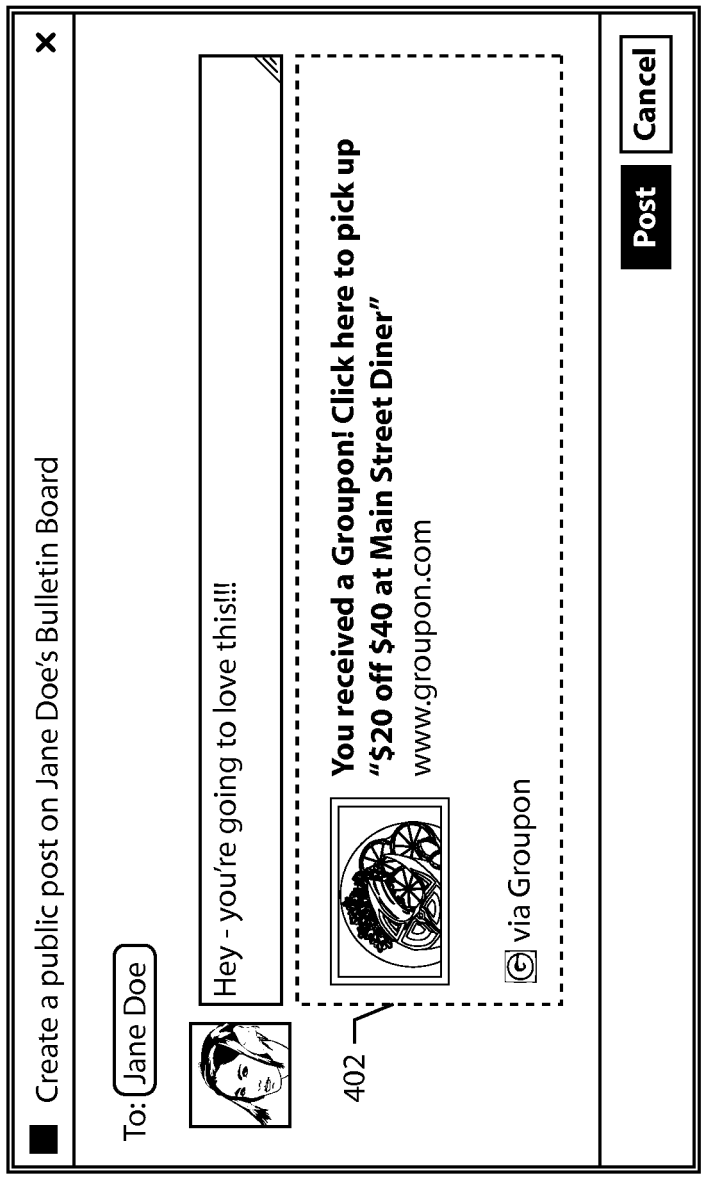
FIG. 4 depicts a screen capture of an interface for receiving a promotion via a social network system in accordance with some embodiments discussed herein.

FIG. 4 depicts a screen capture of an interface 400 for receiving a promotion via a social network system in accordance with some embodiments discussed herein. The interface 400 depicts a "post" on a social networking page associated with a receiving consumer, whereby the receiving consumer may select a link included in the post 402 to receive a transfer of the displayed promotion. Although the present example depicts a public post 402 for effecting transfer of the promotion, the promotion may also be transferred in a similar manner through the use of a private message via the social networking system. Upon selection of the link within the post 402, the receiving consumer may be directed to an interface for receiving the transfer of the promotion. In some embodiments, a "cookie" associated with the receiving consumer's session may be used to verify to which consumer account the promotion should be associated. In some embodiments, the receiving consumer may not have an account with the promotion and marketing service 102, and selection of the link may prompt the receiving consumer to create an account with the promotion and marketing service 102. Upon creation of an account, the receiving consumer may have the promotion associated with their newly created account. As described above with respect to FIG. 1, selection of the link may further initiate an identity authentication operation with the social network service to verify that the receiving consumer is associated with the social network account for which the transfer was intended.

Figure 5:
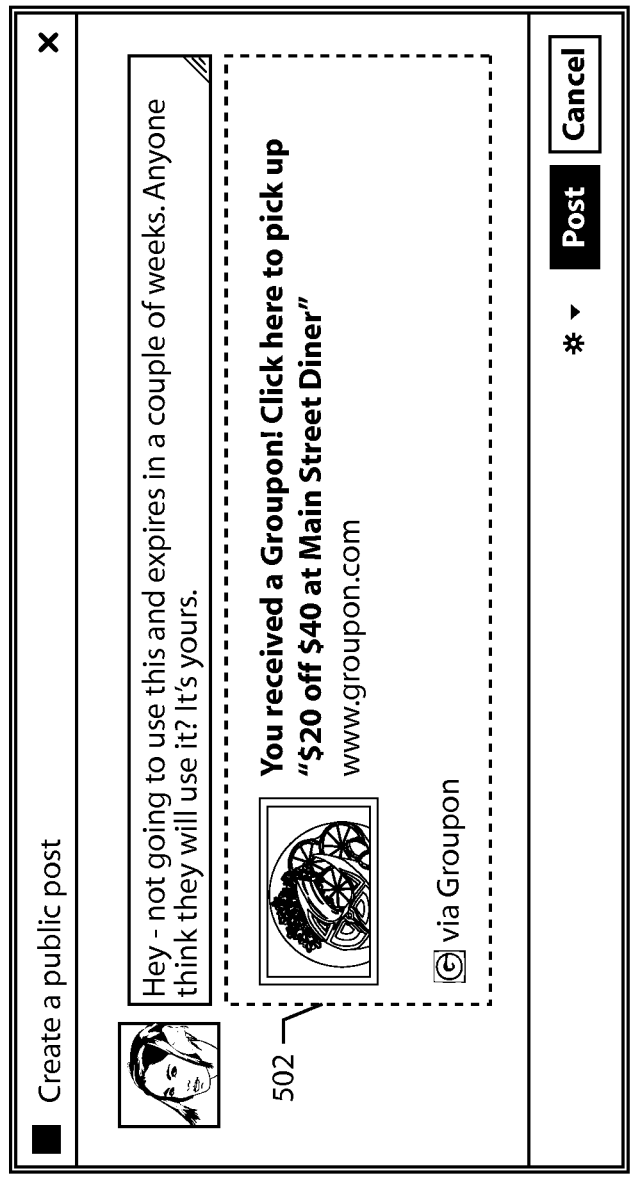
FIG. 5 depicts a screen capture of an interface for providing an open reassignment of a promotion via a social network system in accordance with some embodiments discussed herein.

FIG. 5 depicts a screen capture of an interface 500 for providing an open reassignment of a promotion via a social network system in accordance with some embodiments discussed herein. As described above, notifications may be generated that facilitate transfer of promotions in a recipient-agnostic format by transferring the promotion to any user that selects the link or, alternatively, to any user from a particular group of users that selects the link. In this regard, embodiments may facilitate transfer of the promotion to one or more users that select the link on a "first come, first served" manner. The interface 500 thus depicts a social network service post 502 that facilitates such a transfer. Upon selecting the link within the post, a transfer operation may be initiated between the consumer and/or provider that posted the link to the consumer that selected the link. Embodiments of the invention may further facilitate the transfer by verifying if the transfer link is still valid (e.g., by verifying that another consumer has not redeemed the promotion transfer already). In some embodiments, a given post 502 may be associated with multiple promotions. For example, a provider may purchase or otherwise obtain a number of promotions for their own product or service, and provide said promotions via a post on a provider social network page, a provider web page, via a provider e-mail list, or the like.

Figure 6:
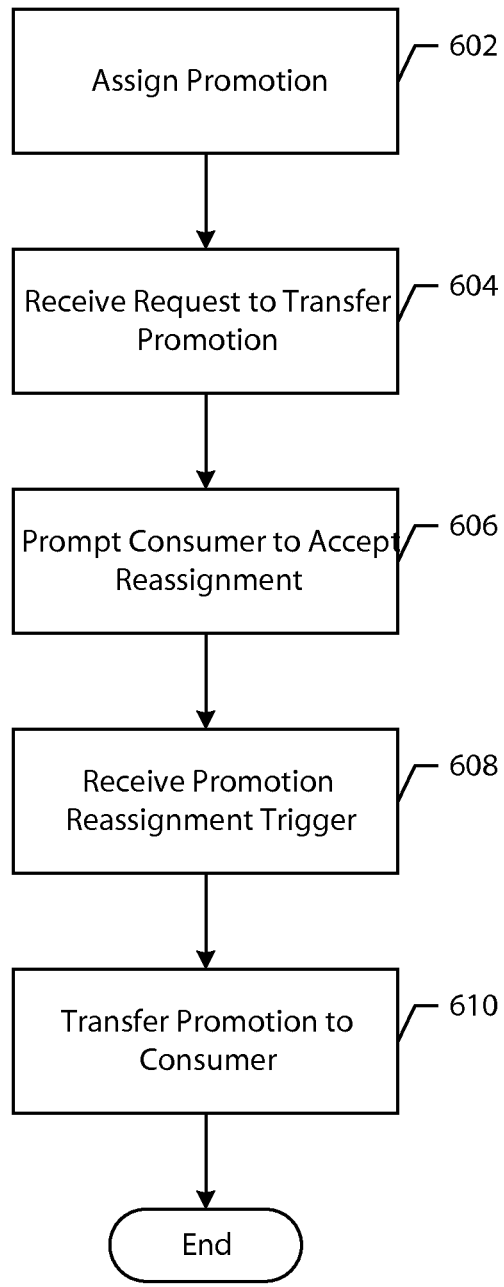
FIG. 6 depicts a flow chart showing an example of a process for transferring a promotion in accordance with some embodiments discussed herein.

FIG. 6 depicts a flow chart showing an example of a process 600 for transferring a promotion in accordance with some embodiments discussed herein. As described above, the promotion and marketing service 102 may function to assign one or more promotions to consumers or providers, and perform transfer operations to transfer the promotions to different consumers or providers. The process 600 provides a method by which the promotion and marketing service 102 may function to facilitate the transfer of promotions among consumers and providers utilizing the promotion and marketing service 102. For example, a user may wish to reassign a promotion they previously purchased and associated with their user account.

Alternatively, the user may be provided with a promotion expressly for the purpose of reassignment. For example, the user may receive a card or promotional code from a merchant that enables them to provide a promotion to another user, such as via a card that includes a message stating "Give your favorite dish to a friend!" As yet another alternative, the promotion may be provided to the user for their own use immediately or on a return visit (e.g., as a promotional code included on a receipt), but the user may instead be provided with the ability to reassign the promotion to another user.

At action 602, a promotion is assigned to a provider or consumer. As described above, the promotion may be purchased or otherwise awarded to a first consumer or a provider. Assignment of the promotion may occur using a promotion assignment database. For example, the promotion assignment database may track every promotion generated using the promotion and marketing service 102, and the providers or consumers to which the promotions are assigned.

At action 604, a request to transfer the promotion is received. For example, a provider or first consumer may select an interface control such as described above with respect to FIG. 3 to initiate a transfer. The request may include an identity of a recipient consumer or consumers, or the request may indicate that the transfer is intended to be recipient-agnostic (e.g., a "free for all" reassignment).

At action 606, a prompt may be generated for accepting the transfer. As described above, a recipient consumer may be presented with a notification such as an e-mail, text message, social network message, or the like with a link that can be selected by the recipient consumer to cause the transfer of the promotion. Additionally or alternatively, the acceptance prompt may be created as part of a "free for all" message that allows any user who selects the link to receive a transfer of the promotion.

At action 608, a promotion reassignment trigger is received, such as in response to a consumer selecting a link associated with a notification prompt. In response to receiving the promotion reassignment trigger, the promotion is transferred to the recipient consumer at action 610. As described above, transfer of the promotion may occur within a promotion assignment database, such that the recipient consumer is associated with the particular promotion in place of the consumer or provider from whom the transfer was performed.

Figure 7:
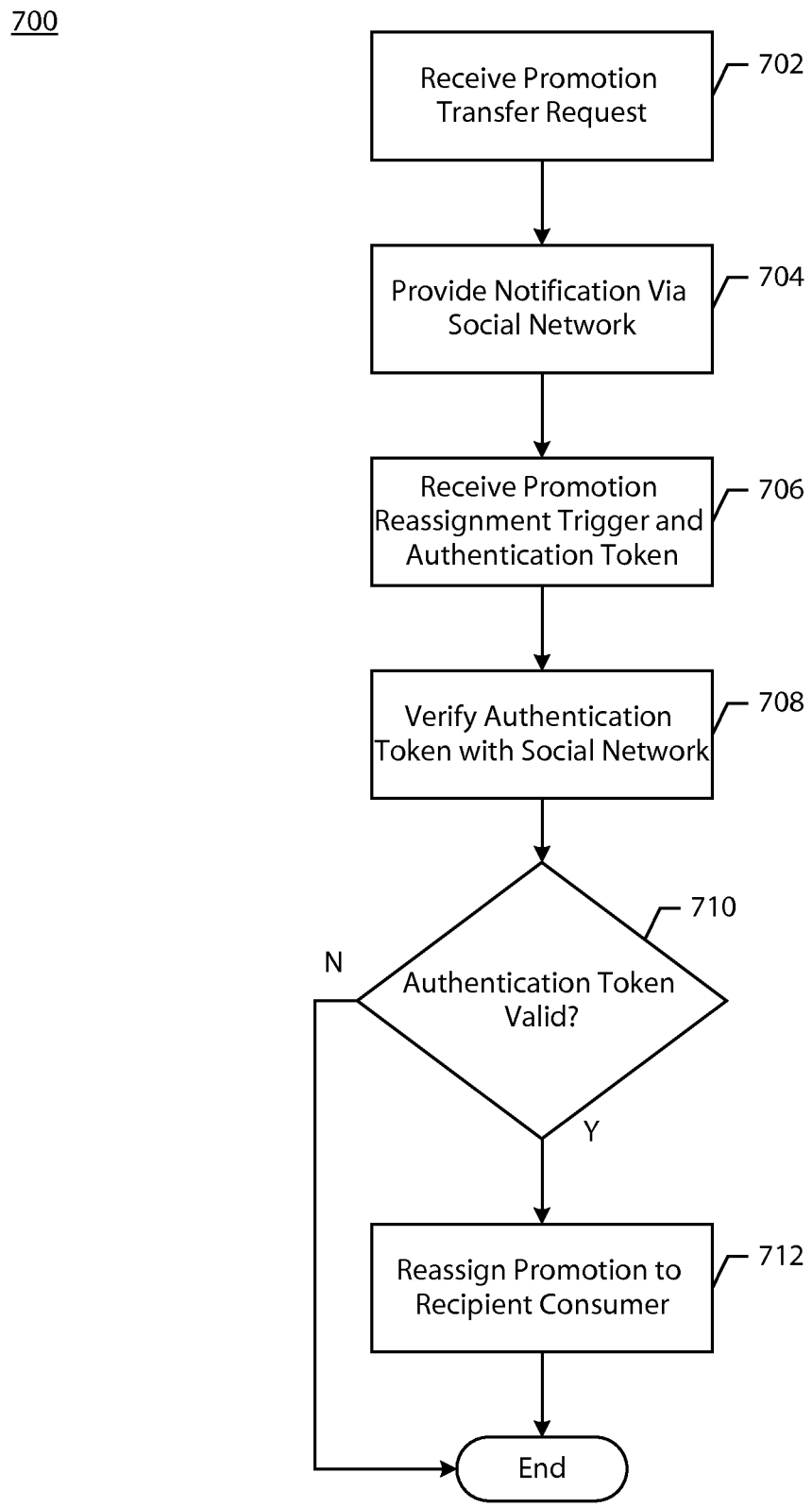
FIG. 7 depicts a flow chart showing an example of a process for transferring a promotion using a social network in accordance with some embodiments discussed herein.

FIG. 7 depicts a flow chart showing an example of a process 700 for transferring a promotion using a social network in accordance with some embodiments discussed herein. As described above, the promotion and marketing service 102 may interface with a social networking service 108 to facilitate transfer of promotions among providers and consumers. The process 700 provides a method by which authentication measures provided by the social networking service 108 may be used to verify the identity of a recipient consumer to ensure that the promotion is assigned to the correct recipient. In some embodiments, the process 700 may also verify other attributes, such as whether the recipient has performed particular actions, or whether certain external actions (e.g., non-recipient related actions) have occurred, such as whether a particular date or time has passed, whether a merchant social networking page has received a certain number of responses, or the like. The process 700 therefore provides for the ability to publish or otherwise generate notifications to multiple users for reassignment of promotions, along with verification of user identities to perform the promotion transfer using the promotion and marketing system. In some embodiments, the process 700 may be employed to generate a "free for all" post via a social networking service, or as part of a game or other interactive user environment for which promotions may be distributed as a prize or reward.

At action 702, a request to transfer a promotion is received. As described above with respect to FIG. 6, the request may include an identifier of a particular promotion and one or more recipients of the promotion transfer. Alternately, the request may specify that the transfer is not associated with a particular recipient, and that the promotion is a free-for-all. The promotion transfer request may further specify a particular social network, and one or more social network users. For example, the promotion transfer request may specify that it is valid for redemption by one of the user's social network friends, a particular social network friend, or only a particular social network without any particular specified users (e.g., that the promotion transfer may be accepted by any user of the particular social network).

At action 704, a notification is provided via the social network. As described above with respect to FIGS. 5 and 6, the notification may be provided to a particular user, to a group of users, or as a user-agnostic post. The post may include a description of the particular promotion, along with a link or other interface control for creating a transfer operation for the promotion.

At action 706, a promotion reassignment trigger is received, along with an authentication token for the social network. As described above, the promotion reassignment trigger may include an indicia that a transfer should be created to a particular recipient consumer. The authentication token may include data that allows for verification of an identity of the user with a social network service. For example, selection of a link within the social networking system may generate a public key from the social network service along with a request to receive a transfer of the promotion.

At action 708, the authentication token received at action 706 is provided to the social network service for verification. Since the authentication token is provided directly to the social network service, the authentication token may be used to independent verify whether the user is associated with the social network account to which they purport to be associated. The authentication token may also be used to link the social network service account with the user's account with the promotion and marketing service. By linking the social network account that selected the link to create the transfer of the promotion and the user's account with the promotion and marketing service, the user's account with the promotion and marketing service may be identified as the recipient of the promotion. In some aspects, verification may also detect whether a given user has performed certain actions in addition to verification of the user's identity. For example, the verification may determine whether the user has achieved a high score in a game, signed up for a merchant newsletter, "liked" a merchant's social networking page, or the like.

At action 710, a determination is made as to whether the authentication token was successfully validated. If the token is successfully validated, the process proceeds to action 712 where the promotion is transferred to the recipient. Otherwise, if the token is not successfully validated, the process ends without transferring the promotion.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

Figure 8:
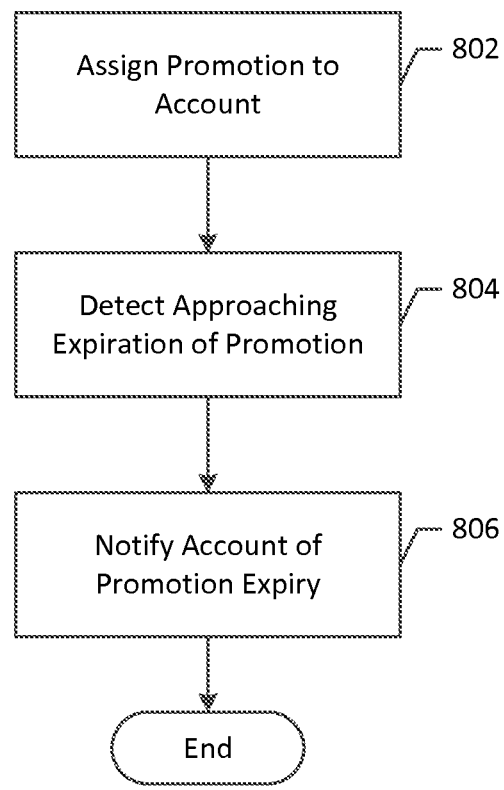
FIG. 8 depicts a flow chart showing an example of a process for generating a reminder of an expiring promotion to facilitate a promotion transfer operation in accordance with some embodiments discussed herein.

FIG. 8 depicts a flow chart showing an example of a process 800 for transferring a promotion using a social network in accordance with some embodiments discussed herein. The process 800 is operable to notify an account (e.g., a user account or a merchant account) of an impending expiration of one or more promotions assigned to the account. In response to detecting the impending expiration, the process 800 may generate a notification to the account, reminding the account about the expiring promotion. The notification may include an interface control reminding the account that the promotion may be transferred in the event it appears the account will be unable to redeem the promotion prior to expiration. In this manner, the process 800 may improve redemption rates for promotions by allowing accounts that will not be able to redeem the promotion to transfer the promotion to accounts that will.

At action 802, a promotion is assigned to an account. As described above with respect to FIGS. 2-7, the promotion may be assigned to the account when a user purchases the promotion, when a merchant generates the promotion, or any other mechanism for assigning or transferring a promotion. In some embodiments, assignment of the promotion to the account may be performed via a transfer operation such as described herein with respect to FIGS. 6-7. The promotion may include an expiration timer. For example, initially purchased promotions may be valid for a particular period of time from purchase (e.g., 3 months, 6 months, 1 year) during which the promotion must be redeemed.

In some embodiments, reassignment of the promotion may alter or extend the duration of the promotion. For example, if a user transfers a promotion to another account and the promotion only has a short time remaining (e.g., less than a day), then the promotion duration may be extended upon performing the transfer (e.g., a promotion with less than a day remaining may be extended to a full day, a week, or a month). In some embodiments, transfer operations that add duration to a promotion may be verified or otherwise policed to ensure that a user is not attempting to "game the system" to add duration to the promotion while still intending to have the original user redeem the promotion. For example, process 800 may verify that the recipient account is associated with a different user than the account to which the promotion was originally assigned, or the process 800 may verify that the recipient account has never received the promotion (e.g., to avoid a scenario where a first account buys the promotion and allows the duration to run low, the promotion is transferred to a second account refreshing the duration, and then the promotion is transferred back to the first account with an extended duration).

In some embodiments, promotions may include an "extension period" or "grace period" that extends beyond the original expiration time of the promotion, but which is not invoked unless the promotion is transferred. For example, a promotion may have a 6 month expiration timer, and a one week grace period. If the promotion is transferred within a certain range of the expiration (e.g., with less than one month, one week, or one day remaining in the initial 6 month expiration period), then the user receiving the promotion may have the expiration of the promotion extended for all or part of the grace period. In some embodiments, the amount of the extension into the grace period is controlled by the remaining time on the initial expiration period. For example, a promotion transferred one week prior to the end of the initial expiration period may receive one day of time into the grace period, while a promotion transferred 6 hours prior to the end of the initial expiration period may receive an entire week of time into the grace period. In some embodiments, future transfers may not add time to the expiration timer of the promotion beyond the end of the grace period, such as to avoid perpetual refreshing of the expiration timer of the promotion.

At action 804, the approach of the expiration of the promotion is detected. For example, the process 800 may detect that a particular promotion has one month, one week, one day, or any other time remaining before expiration. In some embodiments, the detection threshold may be configurable by the user, such that the user controls how frequently expiration reminders are sent.

At action 806, detection of the expiration may cause a notification to be sent to the account associated with the promotion to remind the account that the promotion will soon expire. The notification may include a prompt or interface control allowing the account receiving the promotion to transfer the promotion to another account via a transfer operation as described above.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for transferring promotions comprising:
generating a post to a social media service using a processor, the post viewable by a first selecting device and one or more other selecting devices, the post associated with one or more promotions offered by a promotion and marketing service different from the social media service, the one or more promotions having been previously claimed but not yet redeemed, wherein the post comprises an interface control,
wherein the interface control is configured such that,
(i) when first selected, an interface configured to enable the selecting device and the one or more other selecting devices to display first additional information associated with the one or more promotions and a link is provided, wherein the link is configured such that, when selected, a non-redemptive transfer of at least one of the promotions to a promotion and marketing service user account is initiated, each of the one or more promotions comprising at least an electronic voucher or code that is redeemable in exchange for a product or service, and
(ii) when subsequently selected after the link configured such that, when selected, the non- redemptive transfer of the at least one of the promotions is initiated, an interface configured to enable the selecting device and the one or more other selecting devices to display second additional information is provided;
providing the post to a plurality of social media user accounts;
receiving one or more first selections, of the interface control of the post, from each of a plurality of selecting devices, the plurality of selecting devices being a portion of the selecting device and the one or more other selecting devices;
providing the interface configured to enable the selecting device to display the first additional information associated with the one or more promotions and the link;
receiving at least one promotion reassignment trigger subsequent to a selection of the interface control, wherein the promotion reassignment trigger is the selection of the link configured such that, when selected, the non-redemptive transfer of the at least one of the promotions is initiated, wherein the selection of the link is associated with at least one of the social media user accounts;
subsequent to receiving the at least one promotion reassignment trigger, modifying the interface control such that, upon selection by the selecting device or any of the one or more other selecting devices, the first additional information is no longer displayed, and instead, upon selection by the selecting device or any of the one or more other selecting devices, modifying the interface control such that second additional information is displayed, and modifying both displayed content and function of the link such that, when selected by the selecting device or any of the one or more other selecting devices, the selecting device is configured to display information indicating that the non-redemptive transfer is no longer available and prevent the non-redemptive transfer of the at least one of the promotions to any other promotion and marketing service user accounts associated with the plurality of social media user accounts;
determining a promotion and marketing service user account associated with the at least one of the social media user accounts that selected the interface control; and
in response to receiving the promotion reassignment trigger, causing the non-redemptive transfer of the electronic voucher or code to the determined promotion and marketing service user account.

2. The method of claim 1, further comprising causing a non-redemptive transfer of each of the one or more promotions in response to receiving a plurality of promotion reassignment triggers from the plurality of social media user accounts.

3. The method of claim 2, further comprising:
receiving a second promotion reassignment trigger in response to a second selection of the interface control;
determining that the second promotion reassignment trigger is associated with at least one of a social media user account or a promotion and marketing service user account that has already received at least one of the one or more promotions;

and in response to determining that the second promotion reassignment trigger is associated with a social media user account or a promotion and marketing service user account that has already received at least one of the one or more promotions, preventing the non-redemptive transfer of another promotion to the promotion and marketing service user account in response to the second promotion reassignment trigger.

4. The method of claim 2, further comprising verifying that at least one untransferred promotion remains prior to causing the non-redemptive transfer.

5. The method of claim 1, wherein the method further comprises verifying the identity of the social media user account that selected the link using the social network to which the link was provided.

6. The method of claim 5, wherein the identity of the user account is linked to the promotion and marketing service user account as managed by a promotion and marketing service, wherein the non-redemptive transfer of the at least one of the promotions is caused by the promotion and marketing service, and wherein the non-redemptive transfer is caused by the promotion and marketing service by associating the promotion with the promotion and marketing service user account.

7. The method of claim 5, wherein the plurality of social media user accounts is associated with social networking contacts of a user generating the link.

8. A computer program product, the computer program product comprising at least one non-transitory computer-readable storage medium having computer-readable program code portions stored therein, the computer-readable program code portions comprising:

an executable portion configured to generate a post to a social media service using a processor, the post viewable by a first selecting device and one or more other selecting devices, the post associated with one or more promotions offered by a promotion and marketing service different from the social media service, the one or more promotions having been previously claimed but not yet redeemed, wherein the post comprises an interface control, wherein the interface control is configured such that, (i) when first selected, an interface configured to enable the selecting device and the one or more other selecting devices to display first additional information associated with the one or more promotions and a link is provided, wherein the link is configured such that, when selected, a non-redemptive transfer of at least one of the promotions to a promotion and marketing service user account is initiated, each of the one or more promotions comprising at least an electronic voucher or code that is redeemable in exchange for a product or service, and (ii) when subsequently selected after the link configured such that, when selected, the non-redemptive transfer of the at least one of the promotions is initiated, an interface configured to enable the selecting device and the one or more other selecting devices to display second additional information is provided;

an executable portion configured to provide the post to a plurality of social media user accounts;

an executable portion configured to receive one or more first selections, of the interface control of the post, from each of a plurality of selecting devices, the plurality of selecting devices being a portion of the selecting device and the one or more other selecting devices;

an executable portion configured to provide the interface configured to enable the selecting device to display the first additional information associated with the one or more promotions and the link;

an executable portion configured to receive at least one promotion reassignment trigger in response to a selection of the interface control, wherein the promotion reassignment trigger is the selection of the link configured such that, when selected, the non-redemptive transfer of the at least one of the promotions is initiated, wherein the selection of the link is associated with at least one of the social media user accounts that selected the interface control;

an executable portion configured to, subsequent to receiving the at least one promotion reassignment trigger, modify the interface control such that, upon selection by the selecting device or any of the one or more other selecting devices, the first additional information is no longer displayed, instead, upon selection by the selecting device or any of the one or more other selecting devices, modifying the interface control such that second additional information is displayed, and modify both displayed content and function of the link such that, when selected by the selecting device or any of the one or more other selecting devices, the selecting device is configured to display information indicating that the non-redemptive transfer is no longer available and prevent the non-redemptive transfer of at least one of the promotions to any other promotion and marketing service user accounts associated with the plurality of social media user accounts; and an executable portion configured to, in response to receiving the promotion reassignment trigger, cause the non-redemptive transfer of the electronic voucher or code to the determined promotion and marketing service user account.

9. The computer program product of claim 8, further comprising an executable portion configured to cause a non-redemptive transfer of each of the one or more promotions in response to receiving a plurality of promotion reassignment triggers from the plurality of social media user accounts.

10. The computer program product of claim 9, further comprising an executable portion configured to verify that each social media user account and promotion and marketing service user account does not receive more than one of the one or more promotions.

11. The computer program product of claim 9, further comprising an executable portion configured to verify that at least one untransferred promotion remains prior to causing the non- redemptive transfer.

12. The computer program product of 8, wherein the computer program product further comprises an executable portion configured to verify the identity of the social media user account that selected the link using the social network to which the link was provided.

* * * * *

UNITED STATES PATENT AND TRADEMARK OFFICE
CERTIFICATE OF CORRECTION

| | |
|---|---|
| PATENT NO. | : 11,328,367 B2 |
| APPLICATION NO. | : 13/786828 |
| DATED | : May 10, 2022 |
| INVENTOR(S) | : Jonathan Gray Sandridge et al. |

It is certified that error appears in the above-identified patent and that said Letters Patent is hereby corrected as shown below:

In the Claims

In Column 18, Line 8, Claim 1, delete "non- redemptive" and insert -- non-redemptive --, therefor.

In Column 20, Line 56, Claim 11, delete "non- redemptive" and insert -- non-redemptive --, therefor.

In Column 20, Line 57, Claim 12, delete "of" and insert -- of claim --, therefor.

Signed and Sealed this
Third Day of January, 2023

Katherine Kelly Vidal
*Director of the United States Patent and Trademark Office*